United States Patent Office 2,964,536
Patented Dec. 13, 1960

2,964,536
PROCESS FOR THE MANUFACTURE OF 2-HALOGEN-ANTHRAQUINONES

Hansruedi Rickenbacher, Basel, and Heinrich Zollinger, Binningen, Switzerland, assignors to Ciba Limited, Basel, Switzerland No Drawing. Filed July 21, 1958, Ser. No. 749,605

Claims priority, application Switzerland Aug. 16, 1957

7 Claims. (Cl. 260—384)

This invention provides a process for the manufacture of 2-halogen-anthraquinones in a simple manner, wherein a tetrahalogen-hexa-hydroanthraquinone is treated to split off three molecular proportions of hydrogen halide therefrom.

The tetrahalogen-hexahydroanthraquinones used as starting materials correspond to the formula (1)

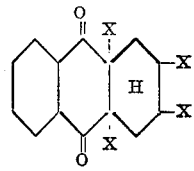

in which the X's represent bromine atoms or preferably chlorine atoms.

The invention also provides a process for the manufacture of tetrahalogen-hexahydroanthraquinone of the Formula 1 wherein 1:4-dihydroanthraquinone is reacted in an inert organic solvent with free chlorine or bromine at a temperature below 40° C. with the exclusion of oxygen and/or under conditions leading to the formation of free radicals, especially with exposure to light. The 1:4-dihydroanthraquinone used as starting material and having the formula

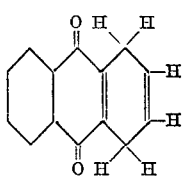

can be obtained by a method in itself known by dehydrogenating, for example, by means of ferric chloride, the tetrahydroanthraquinone obtained by the additive combination of 1:4-naphthoquinone and butadiene.

During the halogenation of 1:4-dihydroanthraquinone two molecular proportions of halogen combine additively with the two olefinic double bonds of the dihydroanthraquinone. Suitable inert solvents are, especially halogenated aliphatic hydrocarbons of low molecular weight, which contain at least one hydrogen atom advantageously such as contain up to 4 carbon atoms, for example, methylene chloride, ethylene chloride, tetrachlorethane, trichlorethane, and especially chloroform. It is of advantage to use at least 10 parts of the solvent for each part of dihydroanthraquinone. The reaction temperature must not exceed 40° C. because at higher temperatures the oxidizing and substituting action of the halogen strongly predominates, so that only a small amount of halogen reacts additively, and the dihydroanthraquinone is oxidized to a considerable extent to anthraquinone.

As the additive combination of halogen is a strongly exothermic reaction it is of advantage to cool the reaction mixture externally. The addition of halogen to the double bond in the 2:3-position takes place very easily, but in order to bring about additive combination at the double bonds vicinal to the keto groups it is necessary to work with the exclusion of oxygen and/or under conditions leading to the formation of free radicals. The oxygen can easily be expelled from the apparatus and the reaction mixture by means of a current of nitrogen. Conditions leading to the formation of free radicals can be produced by the addition of substances forming free radicals, for example, hexa-aryl-ethanes, peroxides, such as benzoyl peroxide, or organometal compounds such as lead tetraethyl. It is of advantage to produce the free radicals in the reaction mixture by irradiation with a light rich in energy, that is to say, light that is rich in ultra-violet rays, for example, direct sunlight or the light of a mercury vapor lamp.

It is also of advantage to work both with the exclusion of oxygen and under conditions leading to the formation of free radicals. When the reaction is carried out in the presence of one of the aforesaid solvents, the greater part of the tetrahalogen-compound formed separates out during the reaction and can be removed from the reaction mixture. The mother liquor, which contains unchanged dihydroanthraquinone, may be used for the halogenation of a fresh batch of dihydroanthraquinone.

The splitting off of hydrogen halide from the tetrahalogen-hexahydroanthraquinone by the process of this invention is advantageously carried out by heating the tetrahalogen-hexahydroanthraquinone in the absence of a solvent or diluent at a temperature of at least 250° C. and advantageously at a temperature within the range of 300° C. to 350° C. Under these conditions the splitting off of hydrogen halide takes place very rapidly and in the correct manner, and an almost pure 2-halogen-anthraquinone is obtained.

The following examples illustrate the invention, the parts being by weight:

Example 1

84.1 parts of 1:4-dihydroanthraquinone are suspended in 985 parts of chloroform in a glass flask fitted with stirring means, a reflux condenser, a mercury vapor lamp, an inlet tube for nitrogen, an inlet tube for chlorine and a thermometer. Air present in the apparatus is displaced by means of a current of nitrogen, and then chlorine is introduced while exposing the contents of the flask to the rays of the mercury vapor lamp. The temperature of the mixture is maintained at 20–30° C. by means of an ice bath. After a reaction period of 10 hours, the product which is precipitated is filtered off and washed with chloroform. There are obtained 67.1 parts of tetrachloro-hexahydroanthraquinone melting at 249–251° C. The colorless compound can be recrystallized from glacial acetic acid. It contains 40.3% of chlorine (calculated quantity, 40.28%).

Example 2

10 parts of tetrachloro-hexahydroanthraquinone are heated in the course of 30 minutes from 250° C. to 300° C. The bath temperature is maintained for one hour at 300–310° C. Gaseous hydrogen chloride is evolved. Products that sublime on the wall of the vessel are scraped off and returned to the melt. The whole is allowed to cool, and, if desired, the melt is diluted at 250° C. with 12 parts of nitrobenzene and allowed to cool. The mixture is then filtered and, after removing the nitrobenzene by steam distillation, there are obtained 4.9 parts of 2-chloranthraquinone melting at 198–203° C. The yield is 72% of the theoretical yield.

Example 3

In a glass flask as described in Example 1, but without tthe mercury vapor lamp, 42 parts of 1,4-dihydroanthraquinone are suspended in 440 parts of chloroform. The air in the apparatus is expelled by introducing nitrogen. While cooling with ice, chlorine is passed in at 10–15° C., a clear solution being obtained after about 30 minutes. After the addition of 4.2 parts of benzoyl peroxide, chlorine is introduced at 35–40° C. for 24 hours. The reaction mass is allowed to stand for two days at room temperature, and the colorless tetrachlorohexahydro-anthraquinone then separated by filtering with suction. On washing the product with chloroform and drying it, a yield of 27.3 parts is obtained. The melting point is at 249–251° C.

Example 4

In a glass flask as described in Example 1, 42 parts of 1,4-dihydroanthraquinone are suspended in 400 parts of tetrachlorethane. The air in the apparatus is expelled by introducing nitrogen. With irradiation, chlorine is introduced at a temperature of 10–15° C. until a clear solution is obtained, and then for another hour. After that, 4.2 parts of benzoyl peroxide are added and, with irradiation, chlorine is introduced for 8 hours at 35–40° C. The reaction mass is allowed to stand for 8 hours, and the precipitate separated by filtration with suction. 30.6 parts of tetrachlorohexahydroanthraquinone of melting point 225–236° C. are obtained. The solution is concentrated to half its volume and another 11.8 parts obtained the melting point of which is at 208–212° C.

For purification, the crude product can be stirred in about the double quantity by weight of 96% sulfuric acid in which surprisingly, the tetrachlorohexahydroanthraquinone is insoluble, whereas the impurities are for the greater part soluble therein. The product is worked up by filtering with suction, washing with sulfuric acid and water, and drying.

The crude product can also be purified by recrystallization from chlorobenzene.

The melting point of the purified compound is at 250–252° C.

Example 5

In a glass flask as described in Example 1, 42 parts of 1,4-dihydroanthraquinone are suspended in 330 parts of methylene chloride. To prevent clogging, the ends of the gas inlet tubes are above the level of the solution. When the air has been displaced by nitrogen, chlorine is introduced at 10–20° C. for 2 hours, a clear solution forming. After the addition of 4.2 grams of benzoyl peroxide, the reaction mass is chlorinated with irradiation for 8 hours at 35–40° C. It is allowed to stand overnight, and the precipitate filtered off with suction and washed with methylene chloride. The yield of tetrachlorohexahydroanthraquinone is 28 parts. The product melts at 232–235° C. After purification with concentrated sulfuric acid as described in Example 4, the yield is 24 parts, and the melting point is at 245–247° C.

In the resulting methylene chloride mother liquor, another 42 parts of 1,4-dihydroanthraquinone are suspended. When the air has been displaced by nitrogen, the reaction mass is first chlorinated at 10–20° C. for 2 hours, no clear solution being obtained, and then 4.2 grams of benzoyl peroxide added and chlorination continued with irradiation for 8 hours at 35–40° C. The precipitate is filtered off with suction, washed with methylene chloride, and dried. The yield is 32.5 parts of a product melting at 218–232° C. After purification with sulfuric acid the yield is 28.9 parts, and the melting point is at 240–243° C.

Example 6

In a glass flask as described in Example 1, 42 parts of 1,4-dihydroanthraquinone are suspended in 380 parts of trichlorethylene. When the air in the apparatus has been displaced by nitrogen, chlorine is introduced for 2 hours at 10–20° C. 4.2 grams of benzoyl peroxide are added to suspension and, with irradiation, chlorine is introduced at 35–40° C. for 8 hours. The reaction mass is allowed to stand overnight, the precipitate filtered off with suction, washed with trichlorethylene, and dried. A yield of 35 parts is obtained of a product melting at 205–213° C. After purification with sulfuric acid the yield is 29.4 parts and the melting point is at 239–241° C.

Example 7

42 parts of 1,4-dihydroanthraquinone are suspended in 370 parts of chloroform in a glass flask fitted with stirring means, a reflux condenser, a mercury vapor lamp, an inlet tube for nitrogen, a thermometer and a dropping funnel. Air present in the apparatus is displaced by means of a current of nitrogen, and then 32 parts of bromine are introduced dropwise at 10–20° C. in the course of 2 hours while cooling externally with an ice bath and while stirring. Then, while irradiating, 32 parts of bromine are added dropwise in the course of 4 hours at 35–40° C. The reaction mass is allowed to stand overnight, and the precipitate then filtered off with suction. On washing it with chloroform and drying it at room temperature, the yield is 75 parts.

The product is purified with 96% sulfuric acid as described in Example 4, and there remains a yield of 67.4 parts. The colorless tetrabromohexahydroanthraquinone can be recrystallized from toluene. The compound contains 60.20% of bromine (calculated quantity 60.33%).

By evaporating the mother liquor, stirring the residue with 100 parts of 96% sulfuric acid, filtering with suction, washing the residue with concentrated sulfuric acid and water, another 6.0 parts of tetrabromohexahydroanthraquinone are obtained.

What is claimed is:

1. A process for the manufacture of tetrahalogenhexahydroanthraquinone, which comprises reacting 1:4-dihydroanthraquinone in an inert organic solvent with a free halogen having an atomic weight of at least 35 and at most 80 at a temperature below 40° C. in the presence of an organic peroxide and with the exclusion of oxygen.

2. A process for the manufacture of tetrahalogenhexahydroanthraquinone, which comprises reacting 1:4-dihydroanthraquinone in an inert organic solvent with a free halogen having an atomic weight of at least 35 and at most 80 at a temperature below 40° C. with exposure to light which is rich in ultraviolet rays and with the exclusion of oxygen.

3. A process for the manufacture of tetrachloro-hexahydroanthraquinone which comprises reacting 1:4-dihydroanthraquinone in a halogenated aliphatic hydrocarbon having at most 4 carbon atoms and containing at least one hydrogen atom with free chlorine at a temperature below 40° C. with exposure to light which is rich in ultraviolet rays and with the exclusion of oxygen.

4. A process for the manufacture of tetrachloro-hexahydroanthraquinone which comprises reacting 1:4-dihydroanthraquinone in chloroform with free chlorine at a temperature below 40° C. with exposure to light which is rich in ultraviolet rays and with the exclusion of oxygen.

5. A process for the manufacture of 2-halogenanthraquinones, which comprises heating a tetrahalogenhexahydroanthraquinone at a temperature within the range of from 300° to 350° C. in the absence of a solvent.

6. The tetrachlorohexahydroanthraquinone of the formula
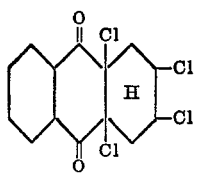
7. The tetrabromohexahydroanthraquinone of the formula
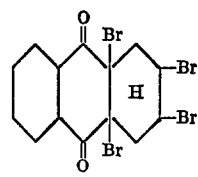
References Cited in the file of this patent
UNITED STATES PATENTS
2,642,445    Lecher et al. _____ June 16, 1953